United States Patent [19]
Scroggie

[11] Patent Number: 5,992,927
[45] Date of Patent: Nov. 30, 1999

[54] WEDGE AND STRIKER ASSEMBLY FOR AUTOMOTIVE DOORS AND DOOR FRAMES

[75] Inventor: David Derek Scroggie, Macomb, Mich.

[73] Assignee: Emhart Inc., Newark, Del.

[21] Appl. No.: 08/920,269

[22] Filed: Aug. 22, 1997

Related U.S. Application Data

[63] Continuation-in-part of application No. 08/586,010, Dec. 29, 1995, abandoned.

[51] Int. Cl.[6] .......................................................... B60J 5/00
[52] U.S. Cl. .......................... 296/207; 16/85; 16/DIG. 6; 16/DIG. 10
[58] Field of Search ................................ 296/207; 16/82, 16/85, 86 R, 86 B, DIG. 6, DIG. 10

[56] References Cited

U.S. PATENT DOCUMENTS

| | | | |
|---|---|---|---|
| 2,054,449 | 9/1936 | Seitz et al. .................................. | 16/85 |
| 4,932,100 | 6/1990 | Flowers et al. .............................. | 16/82 |
| 5,584,528 | 12/1996 | Cozzani .................................... | 296/207 |

FOREIGN PATENT DOCUMENTS

| | | | |
|---|---|---|---|
| 2632576 | 12/1989 | France .................................... | 296/207 |
| 2643033 | 8/1990 | France .................................... | 296/207 |
| 0063981 | 3/1990 | Japan ..................................... | 296/155 |

*Primary Examiner*—Dennis H. Pedder
*Attorney, Agent, or Firm*—Edward D. Murphy

[57] ABSTRACT

A wedge assembly for supporting automotive doors, particularly pivoted tail gate doors and sliding van doors, which is mounted between surfaces that are not horizontal so that the load applied to the assembly includes a vertical component. The assembly includes a striker member and a wedge member, the former being mounted on the vertical side pillar of an automotive door frame, and the latter being mounted on the side pillar of a pivoted tail gate or sliding door. The assembly provides both vertical and lateral support for the door and door frame and prevents misalignment between the two which can otherwise develop over the life of the vehicle.

5 Claims, 2 Drawing Sheets

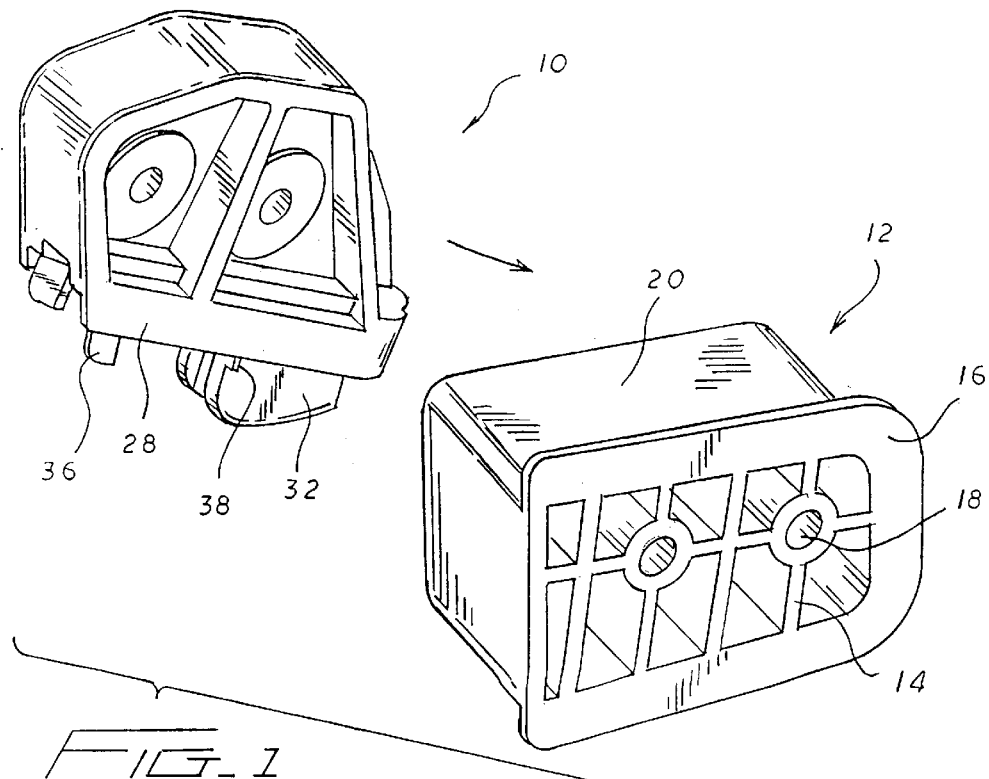
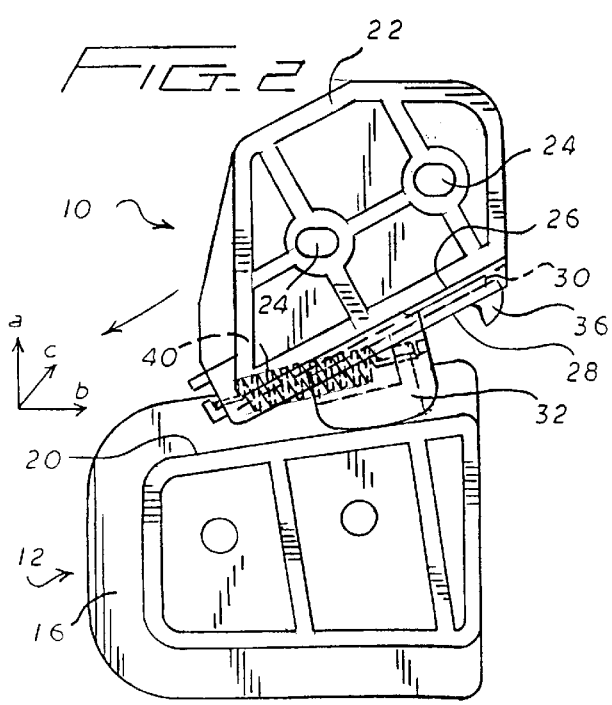
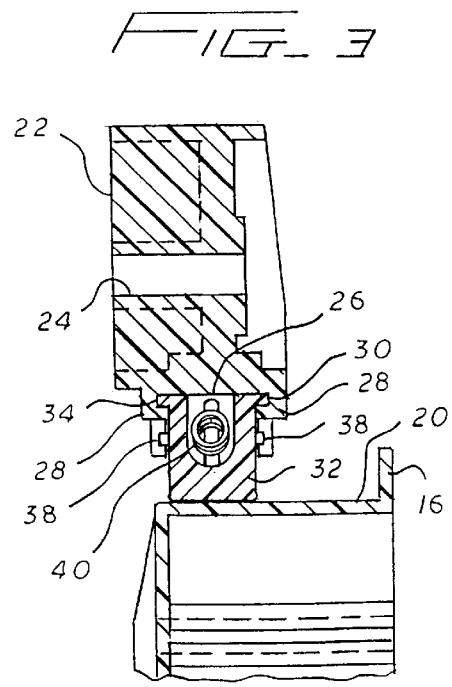

5,992,927

1

WEDGE AND STRIKER ASSEMBLY FOR AUTOMOTIVE DOORS AND DOOR FRAMES

The present application is a Continuation-in-Part of my application Ser. No. 08/586,010, filed Dec. 29, 1995, now abandoned which is incorporated herein by reference. Also, the disclosures of U.S. patent application Ser. No. 08/317, 958, now abandoned, is incorporated herein by reference.

BACKGROUND OF THE INVENTION

The assemblies disclosed therein are primarily intended to support crush loads applied vertically downward on the assembly.

The present invention relates to wedge assemblies for supporting doors, particularly tail gate doors and sliding van doors in motor vehicles.

During normal use over time, automotive doors and door latching systems may rattle and thereby generate stress that contributes to metal fatigue at the hinge and at the latch locations. In order to obviate these unwanted consequences, wedge assemblies have been used between the door frame and the door to prevent such vibrations from occurring. One such assembly is a spring-biased wedge assembly set forth in U.S. Pat. No. 4,932,100 and assigned to the present assignee, the disclosure of which is incorporated herein by reference.

In that assembly a slide member is captured by a base plate which is mounted to the door of a vehicle, such that the slide member or wedge element is slidable along a pair of spaced parallel and inclined cam surfaces on the base plate. The wedge or slide is pulled towards a start or extreme position at one end of the cam surfaces by a spring and can thus be forced down the cam surfaces against the action of the spring by the vehicle surface which it strikes when the door is closed. Such devices are designed to be supported on a horizontal surface of the door of a vehicle and cooperate with an exposed metal surface of the automotive frame. It has been found that the wedge or sliding element, which is usually molded plastic, is subjected to severe stress from continuous contact with the metal door frame, such that the sliding element can become structurally weakened and deformed over time even contributing to the very misalignment which it was designed to prevent.

Also, in the case of horizontally pivoted tail gate doors that swing down for closure, an enormous amount of torque load is experienced along the length and width of the door, giving rise therefore to twist and weakening of the hinge or mounting points of the door. Similarly, in the case of sliding doors for vans that experience compound motions when brought to closure, an equally large amount of torque may be generated via the considerable dimensions of such doors. There is a need then for a wedge assembly which can overcome these detrimental forces or torque loads and so provide proper closure between such doors and their door frames and thus maintain a rigid relation between the two that will prevent misalignment.

OBJECTS AND SUMMARY OF THE INVENTION

It is the primary purpose and principle object of the present invention to provide an improved wedge and striker assembly which will overcome the shortcomings and limitations described above and which will insure that such vehicle doors are returned to their proper squared-off position upon closure.

It is another object of the present invention to provide a wedge and striker assembly for use with automotive doors

2 which provides both vertical and lateral component of force for support of the door with respect to the door frame and thus will prevent misalignment between the automotive door and door frame which would otherwise develop over the life of the vehicle.

It is yet another object of the present invention to provide a wedge and striker assembly for use with automotive doors which protects the moving parts therein as well as the support members for such moving parts, and in which some tolerance take-up is allowed between the striker member and the wedge device.

According to one embodiment of the present invention there is provided a wedge and striker assembly in which a wedge device comprising a slide and spring member is mounted on one or both side pillars of a pivoted tail gate or in the case of a sliding door at least one wedge device is mounted on the side pillar of the door. Further, a striker member for cooperating with the wedge device so mounted on the tail gate or sliding door is also mounted on a vertical pillar of the automotive frame or body facing the corresponding vertical side pillar of the door. The striking or working surfaces of the assembly are inclined with one another so that a compound force is set up between the parts upon closure of the door with its door frame.

The invention will be better understood and further objects and advantages thereof will become more apparent from the ensuing detailed description of the preferred embodiment taking in conjunction with the drawings.

BRIEF DESCRIPTION OF THE DRAWINGS

FIG. 1 is schematic plan view of the wedge and striker assembly according to the present invention showing the wedge device and the striker member in close operating proximity;

FIG. 2 is a schematic side elevational view showing the two parts of FIG. 1 in contact with one another;

FIG. 3 is schematic cross-section of the assembly shown in FIG. 2;

DETAILED DESCRIPTION OF THE PREFERRED EMBODIMENT

Figure 4:
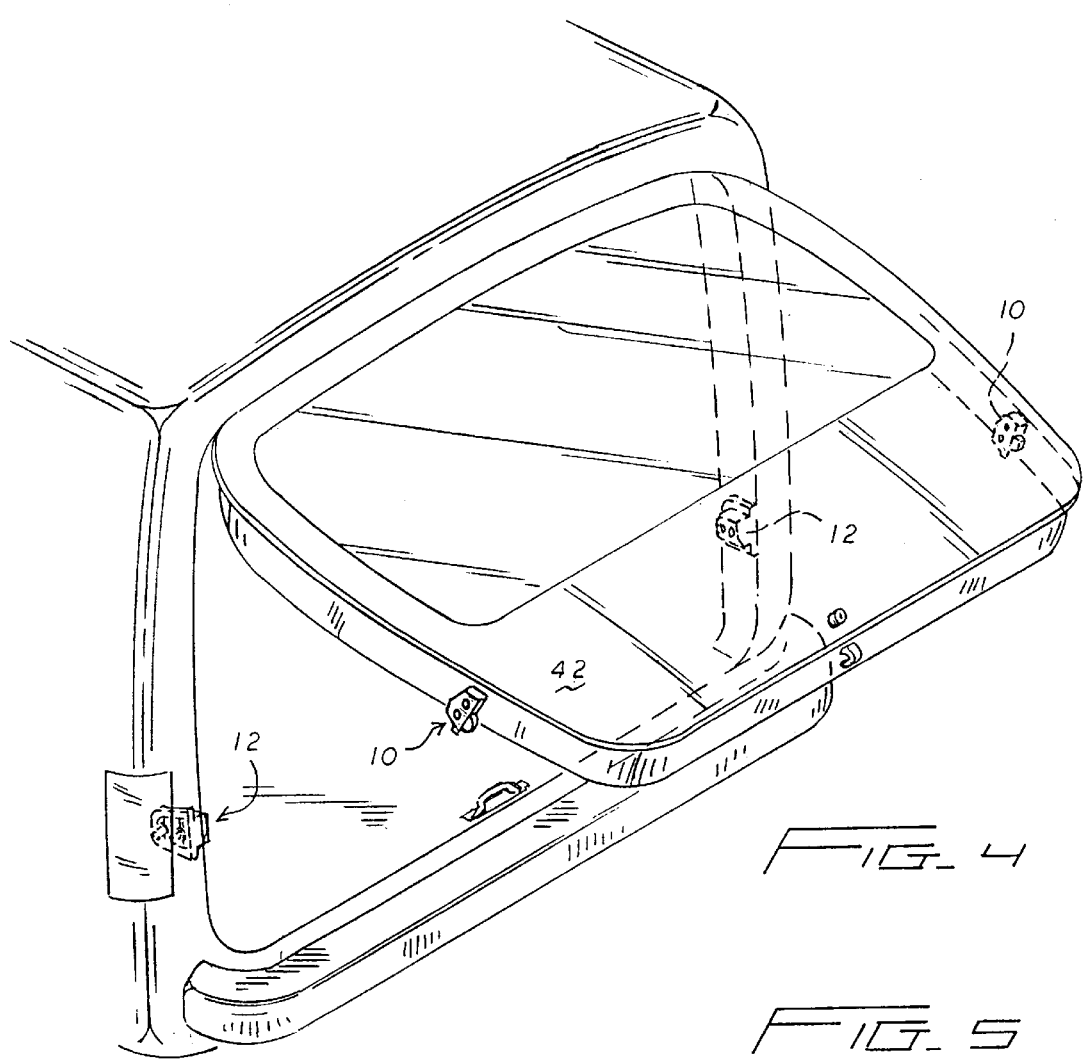
FIG. 4 is schematic view showing the assembly in FIG. 1 mounted for use in a vehicle having a tail gate door.

Referring now to FIGS. 1–3, there is shown a wedge and striker assembly having a wedge device 10 and a striker member 12. The latter is a rigid hollow element of molded material, such as a thermoplastic, having a suitable web-like reinforcing structure and exhibiting high compressive and tensile strength. One face of the striker member defines a flat plane or sidewall surface 14 that may have a flange portion 16, as shown, although the shape or perimeter of the surface 14 is not critical, so long as the surface is flat and fits snugly against a vertical surface of a side pillar of the automotive frame (see FIG. 4). Two apertures 18 are provided for receiving suitable bolts, not shown, for attaching the striker member to a side pillar, again as shown in FIG. 4. An upwardly facing flat surface 20 forms the striker surface itself, which cooperates with the wedge device 10.

As shown in FIGS. 1–3, the wedge device 10, constructed from the same material as the striker member, features a flat sidewall surface 22 (see FIG. 2) which will fit snugly against a vertical surface, that is, a side pillar of an automotive door (see FIG. 4). Two apertures 24 are provided for receiving suitable bolts, not shown, for this purpose. Adjacent to the sidewall surface 22 and facing generally downwardly is a generally flat surface 26 having a pair of flange walls 28 that extend the length of the surface 26 and that have respective slots therein 30 (see FIG. 3) that are parallel to surface 26. A slide element 32 having a pair of cam members 34 which respectively fit into the slots 30 is adapted to slide in a linear fashion between the flange walls 28. Near one end of the flange walls 28, the slots 30 terminate and so provide a terminus for the cam members 34 and hence the slide element 32. At the other end of the flange walls 28 there are provided stop extensions 36 which act as a stop for the slide element at that end of the wedge device by virtue of their engagement with members 38 extending laterally from a front face of the sliding element 32. A spring 40 is provided for biasing the slide element 32 towards one end of the wedge device 10, namely the end of the member that faces the direction of closure for the door upon which the wedge device is mounted. Thus, spring 40 has one end suitably secured to a fixed element, such as a post located at one end the wedge device 10, whereas the other end of the spring is affixed to a suitable support or post disposed within the interior of the slide element 32 (see FIG. 2). Looking at FIG. 1, the arrow shows the direction of closure, and the slide element 32, it will be seen, is biased towards that direction.

Figure 5:
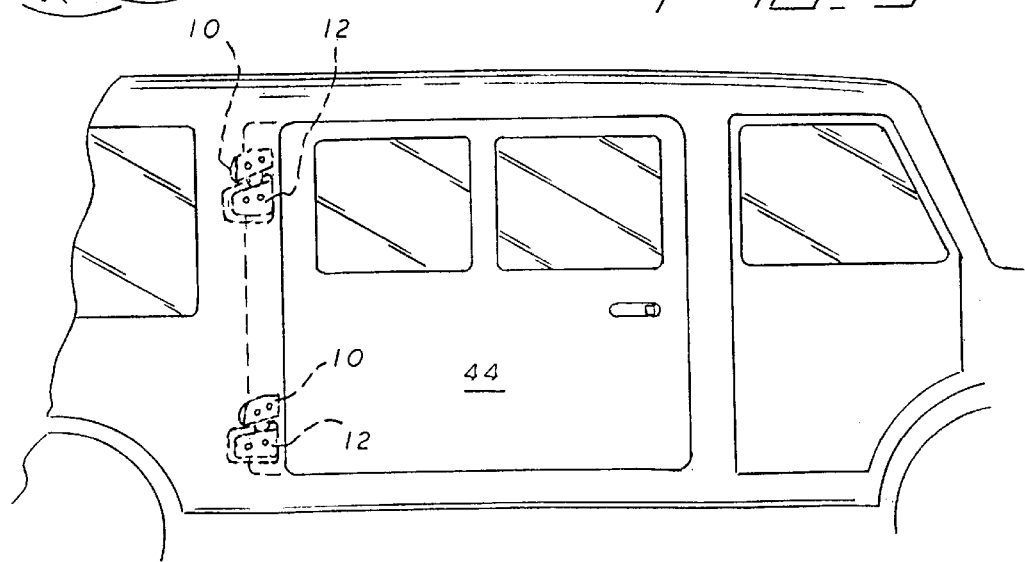
FIG. 5 is a schematic view showing the assembly in FIG. 1 mounted for use in a vehicle having a sliding door.

The wedge and striker assembly shown in FIGS. 1–3 correspond to an assembly mounted on the right side of an automotive door and door frame, such as the right-hand assembly shown in FIG. 4. It is to be understood that a left-hand assembly would form the mirror or reverse image of the right-hand assembly and would be marked as such (as the right-hand assembly would be) for assembly on the left-hand side of the door and door frame. As shown in FIG. 5, two assemblies, according to the invention, could be placed on a sliding door and door frame, as shown, with the striker member 12 being positioned on the vertical pillar of the door frame, and the wedge device 10 being positioned on the vertical pillar of the door. While the preferable arrangement of two assemblies are shown mounted in respectively upper and lower areas, it is conceivable that only one assembly could be used, either in an upper or a lower area, or in a central area.

Referring again to FIG. 2, it will be noticed that the striking surface 20 of striker member 12 is not horizontal when the member is mounted to the door frame; rather, striking surface 20 is inclined with respect to the horizontal at an angle of between 5 and 20 degrees. The slope of striking surface 20 declines from the horizontal in the direction of door closure. Also the downwardly facing surface 26 of the wedge device 10 is seen to be inclined to the horizontal but more steeply than the surface 20, just described. The inclination of surface 26 is in the range of 20 to 35 degrees and the decline of the slope faces the direction of closure in the same manner as just described for surface 20. The steeper incline for surface 26, however, serves to augment or reinforce the bias of the spring 40 against which the slide element 32 is moved along the surface 26 by the striker surface 20 when the two devices, wedge and striker, engage upon closure of the door within the door frame. Thus, the slidable element 32 has to move up the relatively steep incline of surface 26 during door closure. Once closure is completed, the wedge device and striker member will be firmly biased one against the other, owing to the biased position of the slide element 32 wedged between the two inclined surfaces 20 and 26.

It has been found that because of the aforementioned inclined surfaces 20 and 26 and their wedge-like engagement on the slide element 32, there is an intense and localizing force set up between door and door frame at the critical left and right locations of each wedge and striker assembly, as in the tail gate arrangement shown in FIG. 4. This localizing force is a compound force having both vertical and lateral components, as shown by the arrows a, b and c, with a and b being the vertical and lateral components of the compounded or resultant force c.

Further, it should be emphasized that the inclined surfaces of the striker member and the wedge device, respectively, are not parallel but rather inclined with respect to each other as well as the horizontal, so that the compounding force acting on the slide element from each of these surfaces has both vertical and horizontal components; that is, there is always a tendency for these two forces to "square off" the door with respect to its door frame when closure is obtained and thereby prevent misalignment from occurring between them. In effect, a localizing rigidity is set up by the wedge and striker assemblies, according to the invention, every time the door and door frame are brought to closure.

In the case of the tail gate door in FIG. 4, a door 42 is shown to be pivoted on the horizontal. In FIG. 5 a sliding door 44 is shown. Such doors when swung or moved can develop a tremendous amount of torque, especially along their width dimensions, that over time can develop into destructive forces that weaken the hinges or points of connection for such doors, if not eventually the doors themselves. With the use of the wedge and striker assembly, according to the invention, such doors are given strong support at crucial or critical points along the vertical surfaces between the door and door frame, so that misalignment is prevented over the life of the vehicle in which they are used.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A wedge and striker assembly mounted between an automotive door and door frame, said assembly comprising:

a wedge device secured on a generally vertical surface of the automotive door, said wedge device having a first sloping surface extending downwardly from horizontal;

a slide element slidably mounted to said first sloping surface of said wedge device for sliding movement relative thereto;

a spring urging said slide element towards one end of said wedge device; and a striker member secured to a generally vertical surface of the automotive door frame, said generally vertical surface of the automotive door frame being substantially parallel to said generally vertical surface of the door when the door is in a closed position, said striker member having a second sloping surface extending downwardly from horizontal, the slope of said first sloping surface being greater than the slope of said second sloping surface, whereby upon closure of the door, said slide element engages said second sloping surface of said striker member and said slide element slides along said first sloping surface against the bias of said spring, such that said automotive door and door frame are subjected to a force having both a vertical component parallel to said vertical surfaces and a horizontal component normal to said vertical surfaces, which are generated when said wedge device and said striker member are engaged.

2. A wedge and striker assembly according to claim 1, wherein said automotive door is mounted for pivotal movement about a horizontal axis with respect to said door frame.

3. A wedge and striker assembly according to claim 1, wherein said automotive door is mounted for sliding movement with respect to said door frame.

4. A wedge and striker assembly mounted between an automotive door and door frame, said door being mounted for pivotal movement about a horizontal axis with respect to said door frame, said assembly comprising:

- a wedge device secured on a generally vertical surface of each of a pair of side pillars of the automotive door, each of said wedge devices having a first sloping surface extending downwardly from horizontal, said first sloping surface being disposed generally normal to said vertical surface of the door;
- a slide element slidably mounted to each of said first sloping surface of said wedge devices for sliding movement relative thereto;
- a spring urging each of said slide elements towards one end of said wedge device; and
- a striker member secured to a generally vertical surface of each of a pair of side frame members of the automotive door frame, said generally vertical surface of the automotive door frame being substantially parallel to said generally vertical surface of the door when the door is in a closed position, said striker members each having a second sloping surface extending downwardly from horizontal, a slope of said first sloping surface being greater than a slope of said second sloping surface,
- whereby upon closure of the door, each of said slide elements respectively engages said second sloping surface of the corresponding striker member and slides along said first sloping surface against the bias of said spring, such that said automotive door and door frame are subjected to a force having both a vertical component parallel to said vertical surfaces and a horizontal component normal to said vertical surfaces, which are generated when said wedge device and said striker member are engaged.

5. A wedge and striker assembly mounted between an automotive door and door frame, said assembly comprising:

- a wedge device secured on a generally vertical surface of the automotive door, said wedge device having a first sloping surface extending downwardly from horizontal, said wedge device having a pair of opposingly spaced, parallel flanges extending said first sloping surface defining a pair of opposing slots;
- a generally hollow slide element having a pair of cantilevered flange elements, said pair of flange elements being slidably received in said pair of opposing slots of said wedge device for sliding movement relative thereto;
- a plurality of terminals disposed on opposing ends of each of said flange elements for limiting sliding movement of said slide element;
- a spring urging said slide element towards one end of said wedge device; and
- a striker member secured to a generally vertical surface of the automotive door frame, said generally vertical surface of the automotive door frame being substantially parallel to said generally vertical surface of the door when the door is in a closed position, said striker member having a second sloping surface extending downwardly from horizontal, the slope of said first sloping surface being greater than the slope of said second sloping surface,
- whereby upon closure of the door, said slide element engages said second sloping surface of said striker member and said slide element slides along said first sloping surface against the bias of said spring, such that said automotive door and door frame are subjected to a force having both a vertical component parallel to said vertical surfaces and a horizontal component normal to said vertical surfaces, which are generated when said wedge device and said striker member are engaged.

* * * * *